United States Patent
Beppler et al.

(10) Patent No.: US 11,910,346 B2
(45) Date of Patent: Feb. 20, 2024

(54) APPARATUSES AND METHODS FOR MANAGING NETWORK NEIGHBOR RELATIONS USING A REPORTED TIMING ADVANCE

(71) Applicants: AT&T Intellectual Property I, L.P., Atlanta, GA (US); AT&T Technical Services Company, Inc., Vienna, VA (US)

(72) Inventors: David Ross Beppler, Duluth, GA (US); Daniel Vivanco, Ashburn, VA (US); Slawomir Mikolaj Stawiarski, Carpentersville, IL (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 330 days.

(21) Appl. No.: 17/320,348

(22) Filed: May 14, 2021

(65) Prior Publication Data
US 2022/0369257 A1 Nov. 17, 2022

(51) Int. Cl.
*H04W 56/00* (2009.01)
*H04W 40/24* (2009.01)
(Continued)

(52) U.S. Cl.
CPC ..... *H04W 56/005* (2013.01); *H04W 36/0061* (2013.01); *H04W 40/248* (2013.01); *H04W 76/11* (2018.02)

(58) Field of Classification Search
None
See application file for complete search history.

(56) References Cited

U.S. PATENT DOCUMENTS 8,681,724 B2 3/2014 Du et al.
9,264,961 B1 * 2/2016 Shah ................. H04W 36/0072
(Continued)

FOREIGN PATENT DOCUMENTS

WO 2016190789 A1 12/2016

OTHER PUBLICATIONS

Atanasov, Ivaylo et al., "Programmability of Multi-Connectivity in 5G", IEEE, 2022, 8 pages.
(Continued)

*Primary Examiner* — Jutai Kao
(74) *Attorney, Agent, or Firm* — Guntin & Gust, PLC; Kenneth S. Kwan

(57) ABSTRACT

Aspects of the subject disclosure may include, for example, obtaining a first value for a first timing advance (TA) parameter associated with a first device, obtaining a second value for a second TA parameter associated with a second device, wherein an identification of the second device is included in a list of equipment that is related to the first device, obtaining a third value for a third TA parameter associated with a third device, wherein an identification of the third device is not included in the list, comparing the first value, the second value, and the third value to one another to determine that the identification of the third device should be added to the list, and adding, based on the comparing, the identification of the third device to the list, resulting in a modified list. Other embodiments are disclosed.

20 Claims, 7 Drawing Sheets

(51) Int. Cl.
*H04W 76/11* (2018.01)
*H04W 36/00* (2009.01)

(56) References Cited

U.S. PATENT DOCUMENTS

| | | | |
|---|---|---|---|
| 10,034,207 | B2 | 7/2018 | Jung et al. |
| 10,660,104 | B2 | 5/2020 | Patil et al. |
| 11,140,743 | B2 | 10/2021 | Panchal |
| 11,160,130 | B2 | 10/2021 | Henttonen et al. |
| 11,356,880 | B2 | 6/2022 | Jha et al. |
| 2014/0004862 | A1 | 1/2014 | Ekemark |
| 2014/0242991 | A1* | 8/2014 | Yanover ............... H04W 36/22 455/436 |
| 2015/0208300 | A1* | 7/2015 | Mclaughlin ........... H04W 24/02 455/436 |
| 2015/0257064 | A1* | 9/2015 | Lundqvist ......... H04W 36/0094 370/331 |
| 2015/0319668 | A1* | 11/2015 | Guo ..................... H04W 72/51 370/331 |
| 2016/0183147 | A1 | 6/2016 | Da Silva et al. |
| 2016/0309400 | A1* | 10/2016 | Swaminathan ....... H04W 84/02 |
| 2017/0223699 | A1 | 8/2017 | Yasukawa et al. |
| 2017/0339744 | A1 | 11/2017 | Latheef et al. |
| 2018/0049214 | A1 | 2/2018 | Kubota et al. |
| 2018/0279376 | A1 | 9/2018 | Dinan et al. |
| 2019/0306875 | A1 | 10/2019 | Zhou et al. |
| 2019/0319833 | A1 | 10/2019 | Nagaraja et al. |
| 2019/0357292 | A1 | 11/2019 | Cirik et al. |
| 2020/0053613 | A1 | 2/2020 | Cirik et al. |
| 2020/0053824 | A1 | 2/2020 | He |
| 2020/0059841 | A1 | 2/2020 | Zhang et al. |
| 2020/0146063 | A1 | 5/2020 | Xu et al. |
| 2021/0051634 | A1 | 2/2021 | Fakoorian et al. |
| 2021/0084536 | A1 | 3/2021 | Chou et al. |
| 2021/0212091 | A1* | 7/2021 | Pezeshki ............... H04W 36/36 |
| 2022/0046507 | A1 | 2/2022 | Krishnan et al. |
| 2022/0046747 | A1 | 2/2022 | Da Silva et al. |
| 2022/0078650 | A1* | 3/2022 | Lee ....................... H04W 24/10 |
| 2022/0095176 | A1 | 3/2022 | Lim et al. |
| 2022/0110039 | A1 | 4/2022 | Soldati et al. |
| 2022/0132612 | A1 | 4/2022 | Chang et al. |
| 2022/0210706 | A1* | 6/2022 | Parekh ................. H04W 36/30 |
| 2022/0287135 | A1 | 9/2022 | Wu et al. |
| 2022/0369399 | A1 | 11/2022 | Vivanco et al. |
| 2022/0369419 | A1 | 11/2022 | Vivanco et al. |
| 2022/0386173 | A1 | 12/2022 | Vivanco et al. |
| 2023/0138026 | A1 | 5/2023 | Mvanco et al. |

OTHER PUBLICATIONS

Centenaro, Marco et al., "Resource-Efficient Dual Connectivity for Ultra-Reliable Low-Latency Communication", IEEE, 2022, 5 pages.

Yilmaz, Osman N. et al., "Overview of LTE-NR Dual Connectivity", IEEE, 2019, 7 pages.

* cited by examiner

APPARATUSES AND METHODS FOR MANAGING NETWORK NEIGHBOR RELATIONS USING A REPORTED TIMING ADVANCE

FIELD OF THE DISCLOSURE

The subject disclosure relates to apparatuses and methods for managing network neighbor relations using a reported timing advance.

BACKGROUND

As the world increasingly becomes connected via vast communication networks and via various communication devices, additional opportunities are created/generated to provision data to such devices. A communication device may be able to connect to two networks at once (hereinafter referred to as a state or condition of dual connectivity). The use of dual connectivity may enhance the amount of data that may be provided from, e.g., network infrastructure to the communication device over time (e.g., may enhance the effective throughput), which can facilitate an execution of high-quality, data-rich applications (e.g., streaming video) at the communication device.

A mobile communication device may attempt to connect to more than one cell (e.g., may attempt to connect to multiple base stations) of a communication network as part of obtaining communication services. For example, it may be the case that the mobile communication device is obtaining service from a first serving cell and discovers a second candidate cell that is not included in a neighbor list reported by the first serving cell. In some cases, the mobile communication device may report a neighbor candidate that is beyond a desired handover range of the first serving cell. This might be caused by: the mobile communication device being located at an elevation above local clutter (such as in a high-rise building in an urban environment or on a bridge over open water), ducting due to topology or atmospheric conditions, or other (free-space) propagation anomalies. Assignment of distant cells to the neighbor list transmitted by the first serving cell may have degrading effects on the communication network due to excessively long over-the-air (OTA) neighbor lists, which causes the mobile communication device to scan sub-optimal neighbors, and possibly to attempt excessive or sub-optimal handovers. Furthermore, the scanning may tend to increase power consumption by the mobile communication device, which in turn may reduce a battery level/life associated with the mobile communication device.

BRIEF DESCRIPTION OF THE DRAWINGS

Reference will now be made to the accompanying drawings, which are not necessarily drawn to scale, and wherein.

DETAILED DESCRIPTION

Figure 1:
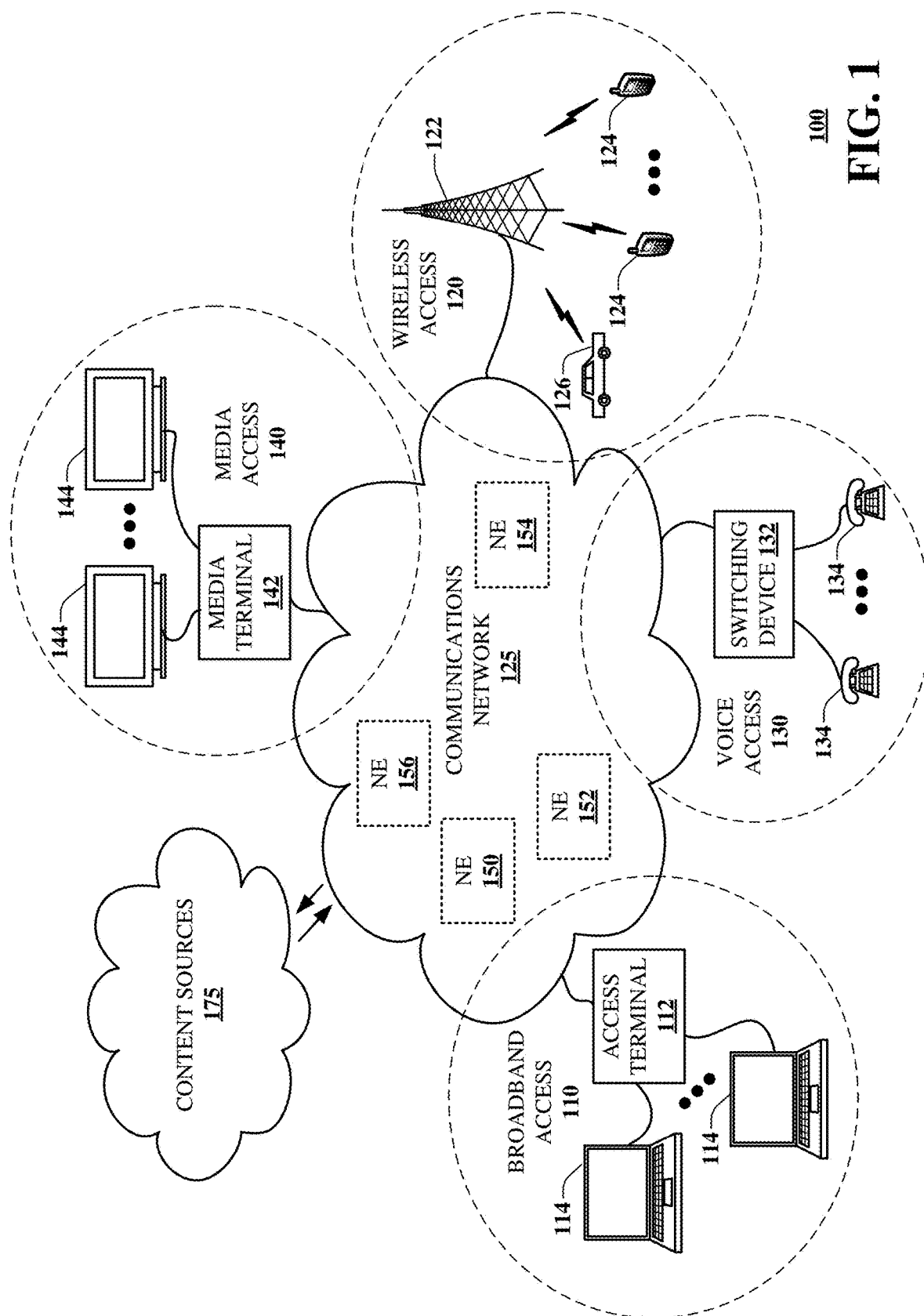
FIG. 1 is a block diagram illustrating an exemplary, non-limiting embodiment of a communications network in accordance with various aspects described herein.

The subject disclosure describes, among other things, illustrative embodiments for managing and regulating relations amongst devices and equipment associated with one or more communication networks and systems. Embodiments of the disclosure are directed to a provisioning of services to one or more communication devices based at least in part on timing advance (TA) information associated with one or more cells, devices, or pieces of equipment. Other embodiments are described in the subject disclosure.

One or more aspects of the subject disclosure include, in whole or in part, establishing a first connection between a user equipment and a first cell of a communication network to provision a first portion of a communication service with respect to the user equipment, obtaining a first value for a first timing advance (TA) parameter associated with the first connection, providing, to the user equipment, a list of relations between the first cell and a plurality of other cells, obtaining, based on the providing of the list of relations, at least a second value for a second TA parameter associated with at least a second cell included in the plurality of other cells, obtaining a third value for a third TA parameter associated with a third cell, wherein the third cell is not included in the plurality of other cells, comparing the first value, the at least a second value, and the third value to one another, determining, based at least in part on the comparing, that a second portion of the communication service should be provided to the user equipment by the at least a second cell, the third cell, or a combination thereof, and providing, based on the determining, the second portion of the communication service to the user equipment via the at least a second cell, the third cell, or the combination thereof.

One or more aspects of the subject disclosure include, in whole or in part, obtaining a list of a plurality of cells, wherein the list relates each of the plurality of cells to a first cell that provides a first portion of a communication service to a processing system, detecting a signal from a second cell, wherein the second cell is not included in the list, based on the detecting, determining a first value for a first timing advance (TA) parameter of the second cell, and based at least in part on the determining, obtaining, by the processing system, a second portion of the communication service from the first cell, the second cell, a third cell, or any combination thereof, wherein the third cell is included in the list.

One or more aspects of the subject disclosure include, in whole or in part, obtaining, by a processing system including a processor, a first value for a first timing advance (TA) parameter associated with a first device, obtaining, by the processing system, a second value for a second TA parameter associated with a second device, wherein an identification of the second device is included in a list of equipment that is related to the first device, obtaining, by the processing system, a third value for a third TA parameter associated with a third device, wherein an identification of the third device is not included in the list, comparing, by the processing system, the first value, the second value, and the third value to one another to determine that the identification of the third device should be added to the list, and adding, by the processing system and based on the comparing, the identification of the third device to the list, resulting in a modified list.

Referring now to FIG. 1, a block diagram is shown illustrating an example, non-limiting embodiment of a system 100 in accordance with various aspects described herein. For example, system 100 can facilitate in whole or in part establishing a first connection between a user equipment and a first cell of a communication network to provision a first portion of a communication service with respect to the user equipment, obtaining a first value for a first timing advance (TA) parameter associated with the first connection, providing, to the user equipment, a list of relations between the first cell and a plurality of other cells, obtaining, based on the providing of the list of relations, at least a second value for a second TA parameter associated with at least a second cell included in the plurality of other cells, obtaining a third value for a third TA parameter associated with a third cell, wherein the third cell is not included in the plurality of other cells, comparing the first value, the at least a second value, and the third value to one another, determining, based at least in part on the comparing, that a second portion of the communication service should be provided to the user equipment by the at least a second cell, the third cell, or a combination thereof, and providing, based on the determining, the second portion of the communication service to the user equipment via the at least a second cell, the third cell, or the combination thereof. System 100 can facilitate in whole or in part obtaining a list of a plurality of cells, wherein the list relates each of the plurality of cells to a first cell that provides a first portion of a communication service to a processing system, detecting a signal from a second cell, wherein the second cell is not included in the list, based on the detecting, determining a first value for a first timing advance (TA) parameter of the second cell, and based at least in part on the determining, obtaining, by the processing system, a second portion of the communication service from the first cell, the second cell, a third cell, or any combination thereof, wherein the third cell is included in the list. System 100 can facilitate in whole or in part obtaining, by a processing system including a processor, a first value for a first timing advance (TA) parameter associated with a first device, obtaining, by the processing system, a second value for a second TA parameter associated with a second device, wherein an identification of the second device is included in a list of equipment that is related to the first device, obtaining, by the processing system, a third value for a third TA parameter associated with a third device, wherein an identification of the third device is not included in the list, comparing, by the processing system, the first value, the second value, and the third value to one another to determine that the identification of the third device should be added to the list, and adding, by the processing system and based on the comparing, the identification of the third device to the list, resulting in a modified list.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
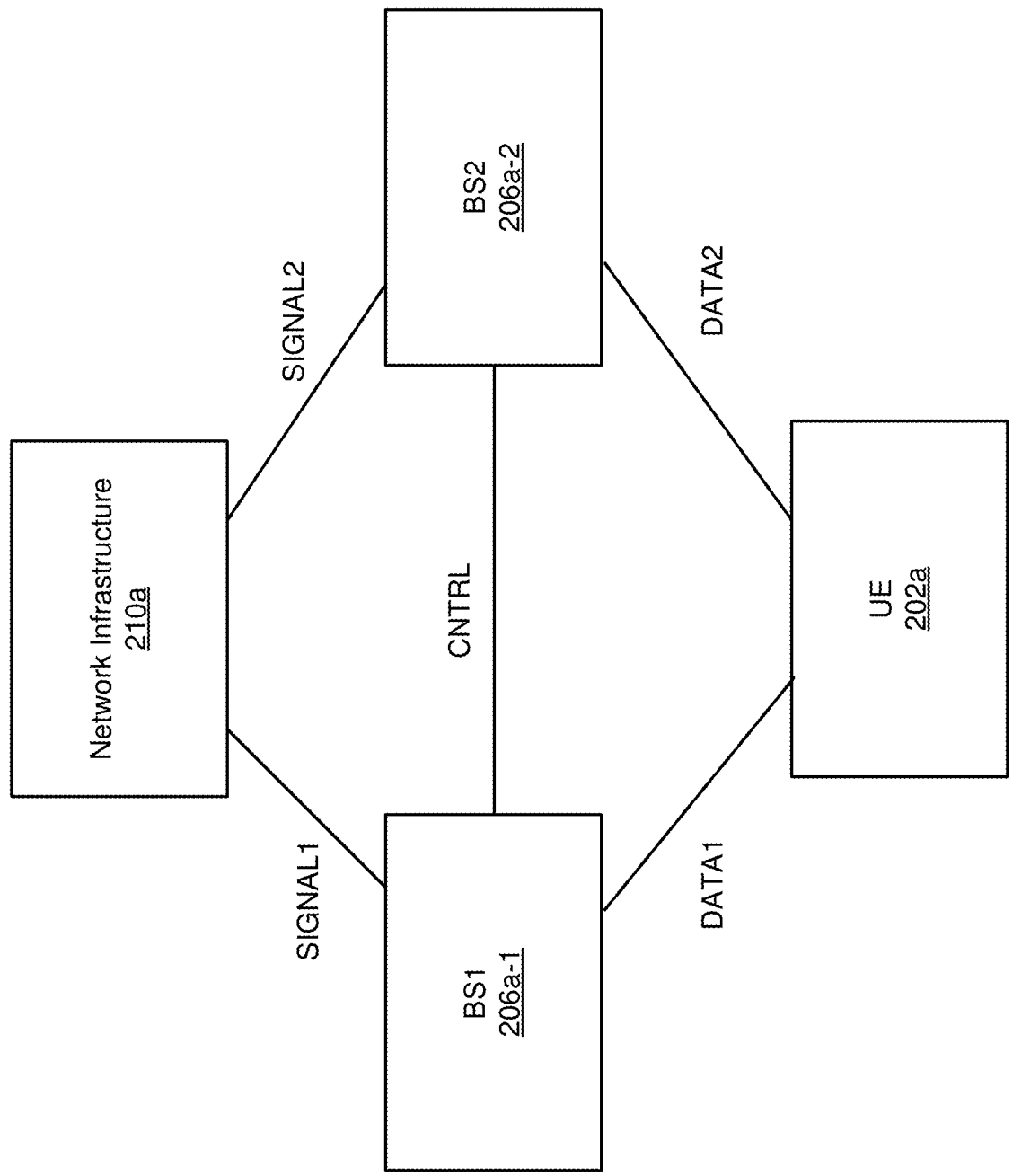
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a in accordance with aspects of this disclosure. In some embodiments, the system 200a may function within, or may be operatively overlaid upon, the communication network 100 of FIG. 1.

The system 200a may support dual connectivity with respect to a communication device, such as a user equipment (UE) 202a. In particular, the UE 202a may be simultaneously connected to a first network and a second network. The first network may be operative in accordance with a first radio access technology (RAT) and the second network may be operative in accordance with a second RAT. The second RAT may be different from the first RAT. In an illustrative embodiment, the first RAT may correspond to an LTE or 4G network technology, and the second RAT may correspond to a 5G network technology.

Continuing the above example, the first network/RAT may be associated with, or include, a first base station (BS) 206a-1 and the second network/RAT may be associated with, or include, a second BS 206a-2. The use of the base stations BS1 206a-1 and BS2 206a-2 in FIG. 2A is illustrative. More generally, communication devices may be used in addition to the base stations and/or in place of the base stations.

In some embodiments, the base stations BS1 206a-1 and BS2 206a-2 may include, be associated with, or may be at least partially replaced by one or more radio intelligent controllers (RICs), mobile edge computing (MEC) devices, centralized self-organized/optimized network (cSON) elements, or the like. Stated slightly differently, functionality associated with the base stations may be distributed amongst other devices (not shown in FIG. 2A), potentially inclusive of other devices that may be located proximal to an edge or boundary of (a cell of) a given network. As one skilled in the art would appreciate, relocating such functionality proximal to the edge of a network may reduce the latency experienced by the UE 202a in terms of, e.g., a transfer of data involving the UE 202a, decision-making processes involving the UE 202a, etc., which may enhance the quality of service (QoS) and/or quality of experience (QoE) involving the UE 202a.

As set forth above, the use of dual connectivity may enhance the amount of data that may be transferred from/to the UE 202a relative to a state/condition where a single network connection is used. In this respect, the UE 202a is shown as potentially being connected to: the BS1 206a-1 via a first link (denoted as DATA1 in FIG. 2A) and the BS2 206a-2 via a second link (denoted as DATA2 in FIG. 2A). In some embodiments, the links DATA1 and DATA2 may effectively be an extension of user plane or signaling functionality between network infrastructure 210a and the base stations BS1 206a-1 and BS2 206a-2 (denoted as SIGNAL1 and SIGNAL2, respectively, in FIG. 2A).

In some embodiments, the system 200a may support/enable a master-slave configuration, whereby the first BS1 206a-1 may serve as a master/primary and the second BS2 206a-2 may serve as a slave/secondary. Control of dual connectivity may be resident in the primary. For example, in operation the UE 202a may initially connect to network/communication services via the primary. If the UE 202a supports dual connectivity on a frequency band that a secondary supports, the primary may instruct the UE 202a to make measurements on one or more channels/links (e.g., DATA2 in FIG. 2A) associated with one or more secondaries. Assuming that the UE 202a finds/locates a candidate secondary based on such measurements, the primary may communicate to the (candidate) secondary (such as, for example, via the control [CNTRL] interface between the base stations BS1 206a-1 and BS2 206a-2 shown in FIG. 2A) any parameters that may be needed to establish a connection between the secondary and the UE 202a. Once the secondary confirms the establishment of the connection with the UE 202a, the primary may forward a part/portion of the data destined for the UE 202a to the secondary for transmission by the secondary to the UE 202a. Optionally, the primary can then request that the network infrastructure 210a (which may include one or more gateways, authentication servers, billing servers, and the like) to directly exchange user data with the secondary. More generally, in relation to a split of data across the two networks/RATs, the split may occur at the network infrastructure 210a, at the primary/BS1 206a-1, and/or at the secondary/BS2 206a-2. The split of data may occur in respect of a downlink direction, an uplink direction, or both downlink and uplink directions.

Dual connectivity is an example of how the system 200a may be used in practice. In another exemplary embodiment, the system 200a may facilitate handover operations, whereby communication services provisioned to the UE 202a may be handed-over from, e.g., the primary 206a-1 to the secondary 206a-2 (or vice versa). As part of providing service to the UE 202a, the primary 206a-1 may transmit to the UE 202a a list of neighbor cells or secondaries. The UE 202a may perform measurements in respect of signals obtained from one or more of the cells/secondaries included in the list to identify if, for example, a cell/secondary included in the list is a viable candidate for handover. In some embodiments, the UE 202a may simply report the measurements to the primary 206a-1 to enable the primary 206a-1 to determine whether a handover is appropriate. In other embodiments, the UE 202a may identify whether a handover is appropriate based on the measurements, and if so, may indicate to the primary 206a-1 an identity of a cell/secondary that the UE 202a requests the handover to.

In some embodiments, the UE 202a may identify/detect signals from candidate cells/secondaries that are not initially included in the list of neighbor cells/candidates transmitted by the primary 206a-1. For example, it may be the case that a candidate is representative of a new cell/secondary that has recently been placed into service (placed into service subsequent to the establishment of the list), or due to other reasons.

Aspects of this disclosure are directed to a determination of whether a candidate cell/secondary detected by the UE 202a is a viable candidate. Based on that determination, the list may be modified. The modification of the list may include adding the candidate cell/secondary to the list, such that subsequent transmissions of the list by, e.g., the primary 206a-1 may include an identification of the candidate cell/secondary. The process of including the candidate cell/secondary in the list (of approved cells/secondaries) may be referred to as white-listing the candidate cell/secondary. In contrast, the modification of the list may include prohibiting the candidate cell/secondary from serving the UE 202a—e.g., the candidate cell/secondary may be included as part of a black-list of the list.

In some embodiments, a determination of whether to white-list or black-list a candidate cell/secondary may be based on timing advance (TA) information. As one skilled in the art would appreciate, TA corresponds to an offset (e.g., a negative-valued offset) applied by the UE 202a between a start of a received downlink subframe and a transmitted uplink subframe. The application of the offset ensures that the downlink and uplink subframes are synchronized on the network side (e.g., at the base station), which helps to ensure that the uplink transmission is successfully received and decoded (where applicable) on the network side.

Based on respective physical locations of the UE 202a, the primary 206a-1, and the secondary 206a-2, the TA in respect of a pairing of the UE 202a and the primary 206a-1 may be different from the TA in respect of a pairing of the UE 202a and the secondary 206a-2. Physical location is one parameter that may influence TA. Other parameters may include anomalies associated with a free-space communication channel, the presence (or analogously, absence) of obstructions in a line-of-sight between the UE 202a and the primary 206a-1 or secondary 206a-2, etc. All of these parameters may combine with one another to establish a signal propagation distance between the UE 202a and the respective cell/base station.

A TA value that is measured for a candidate secondary 206a-2 may be representative of a distance (e.g., a signal propagation distance) between the UE 202a and the candidate secondary 206a-2. If the TA value/distance is greater than a first threshold, the candidate secondary 206a-2 may not be a viable candidate for handover from the primary 206a-1. If the TA value/distance is greater than a second threshold (where the second threshold may be the same as, or different from (e.g., greater than), the first threshold in this example), the candidate secondary 206a-2 may be black-listed. Conversely, if the TA value/distance is less than (or equal to) the first threshold, the candidate secondary 206a-2 may be white-listed.

Respective values for the first threshold and the second threshold described above may be fixed or predetermined in some embodiments. In other embodiments, the values of the thresholds may be adapted based on a user-generated input or in response to an occurrence of one or more events or conditions. In some embodiments, the values of the thresholds may be based at least in part on: network traffic statistics, key performance indicators (KPIs), network loads, user and/or device capabilities or preferences, an identification of applications executed by a UE, an identification of communication sessions engaged in by the UE, a number of candidate cells/secondaries that are able or available to facilitate communication services to the UE, an identification of one or more types of technologies (e.g., RATs) supported by the candidate cells/secondaries, an identification of one or more security schemes supported or implemented by the candidate cells/secondaries, etc., or any combination thereof. Thus, in some instances a candidate cell/secondary may be white-listed (such as, for example, when the number of candidate cells/secondaries is small), and in other instances that same candidate cell/secondary may be black-listed (such as, for example, when the number of candidate cells/secondaries is large).

As set forth above, TA information/values may serve as a source of data, potentially in combination with other data or parameters, to determine neighbor cell relation viability and priority, such as for example in connection with embodiments where many neighbor cells/secondaries may exist. TA information/values may be utilized as a metric to refine an inclusion/exclusion for neighbor relations in respect of one or more cells. In some embodiments, TA information/values may be combined with information regarding network topology or coverage/service areas of a serving cell, a reported candidate cell, and/or previously established (e.g., previously white-listed or black-listed) neighbor cells, to approve or disapprove the candidate cell for service (e.g., dual connectivity or handover). Decision-making processes or logic may be updated/modified/influenced based on an addition or deletion of cells in a network, which may cause changes in cell relations to facilitate efficiencies in network operations and provisioning of services. Still further, metrics pertaining to, e.g., signal strength, interference, noise, etc., may be analyzed to identify a relation/treatment that is to be applied to a candidate cell/secondary.

Figure 2B:
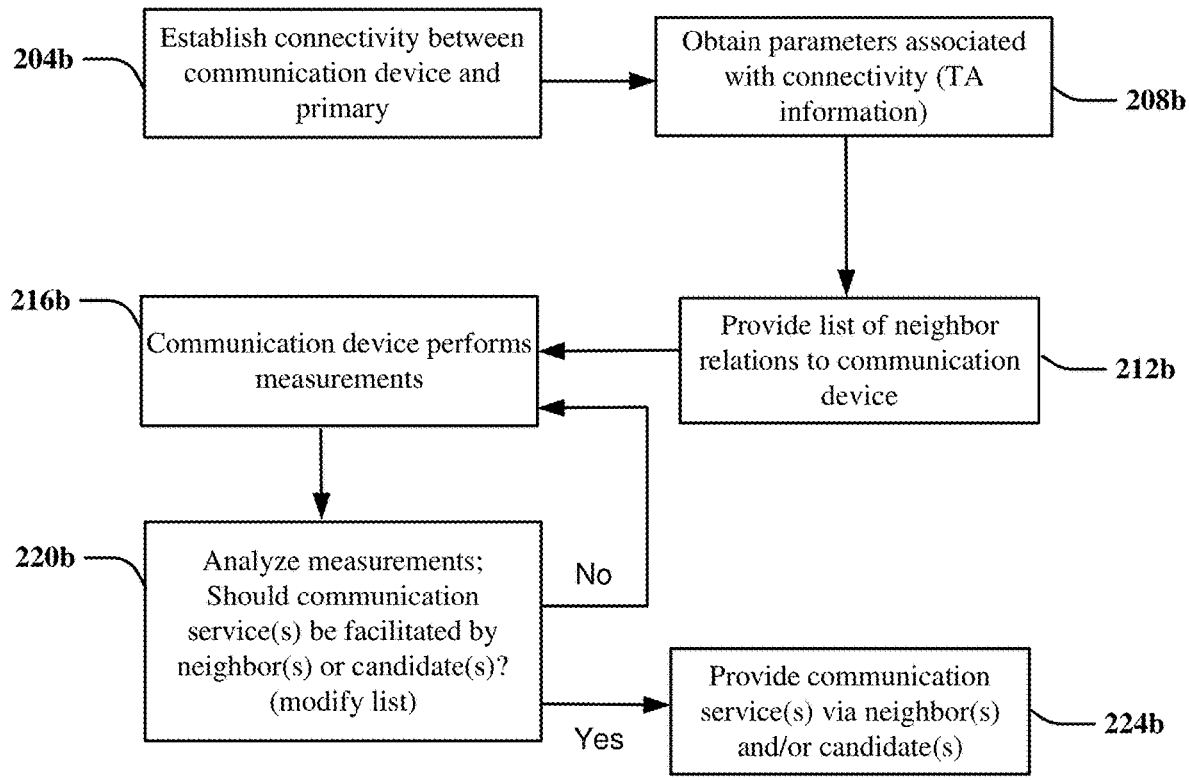
FIG. 2B depicts an illustrative embodiment of a method in accordance with various aspects described herein.

Referring now to FIG. 2B, an illustrative embodiment of a method 200b in accordance with various aspects described herein is shown. The method 200b may be facilitated, in whole or in part, by one or more systems, devices, and/or components, such as for example the systems, devices, and components set forth herein. The method 200b may be executed to manage/regulate relations between cells and/or network components or devices, such as base stations. In some embodiments, the operations/blocks of the method 200b may be executed to identify whether a given candidate cell or secondary is appropriate for providing at least a portion of a communication service to a communication device, such as a UE. Such a communication service (or one or more portions thereof) may be provided utilizing dual connectivity and/or in conjunction with a handover operation from one or more primary/serving cells to one or more secondary/candidate cells.

In block 204b, a communication device (e.g., a UE) may establish connectivity with a primary cell (or associated equipment, such as a base station). The connectivity of block 204b may be used to provision one or more communication services to the communication device.

In block 208b, parameters associated with the connection/connectivity of block 204b may be obtained. For example, TA information may be obtained as part of block 208b.

In block 212b, a list of neighbor/secondary relations (e.g., white-listed neighbors/secondaries, black-listed neighbors/secondaries, etc.) may be provided by the primary to the communication device.

In block 216b, the communication device may perform measurements in respect of signals transmitted by/from the primary and/or in respect of neighbors/secondaries included in the list of block 212b. As part of block 216b, the communication device may perform measurements in respect of signals transmitted by one or more candidates/secondaries that are not included in the list.

In block 220b, the measurements of block 216b may be analyzed, potentially in conjunction with values of one or more parameters as described above and/or in conjunction with one or more thresholds as described above, to determine whether at least a portion of the one or more communication services should be facilitated by a neighbor included in the list and/or a candidate/secondary that is not included in the list. The analysis of block 220b may include an identification or derivation of one or more values for TA associated with a neighbor included in the list and/or a candidate/secondary that is not included in the list. The analysis of block 220b may include a comparison of two or more TA values to identify a best TA value (e.g., a TA value corresponding to a shortest signal propagation distance with respect to the communication device) or a TA value that satisfies one or more thresholds.

As part of block 220b, the list may be updated/modified based on the determination(s) of block 220b. For example, as part of block 220b a candidate/secondary may be added to (a white-list of) the list, may be added to a black-list of the list, etc.

If the determination of block 220b is answered in the affirmative, flow may proceed from block 220b to block 224b; otherwise, if answered in the negative, flow may proceed from block 220b to, e.g., block 216b. In some instances, instead of the flow proceeding from block 220b to block 216b, the flow may proceed from block 220b to, e.g., block 212b, such as for example if the primary transmits an updated/modified list to the communication device (potentially as part of a schedule).

In block 224b, at least a portion of the one or more communication services may be provided to the communication device by one or more neighbors included in the list and/or one or more candidates/secondaries that is/are not included in the list, as determined in block 220b. Block 224b may include the primary facilitating connectivity between the communication device and one or more identified neighbors and/or one or more identified candidates/secondaries. A facilitation of connectivity may include a transfer of parameters associated with one or more communication sessions to ensure continuity of service with respect to the communication device.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As set forth above, aspects of this disclosure may be applied in respect of one or more technologies or types of technology. For example, aspects of this disclosure may be applied in connection with, e.g., UMTS, LTE, 4G, 5G NSA, 5G SA, 6G, etc. Aspects of the disclosure may facilitate a management and regulation of neighbor relations between cells (or associated infrastructure or devices) of one or more networks or systems. In some embodiments, data obtained (e.g., measured) by a communication device (e.g., a UE) may provide insight into how relations between cells or sites should be managed or regulated. In this respect, relations between cells or sites may be adapted in response to changing circumstances or conditions. Such adaptation may be contrasted with pre-configured, static, or theoretical planning methodologies that are often lacking in terms of resolution and sophistication. Stated slightly differently, such pre-configured, static, or theoretical planning methodologies frequently lack an ability to foresee conditions that a communication device may encounter and measure in a practical, real-world network.

Figure 3:
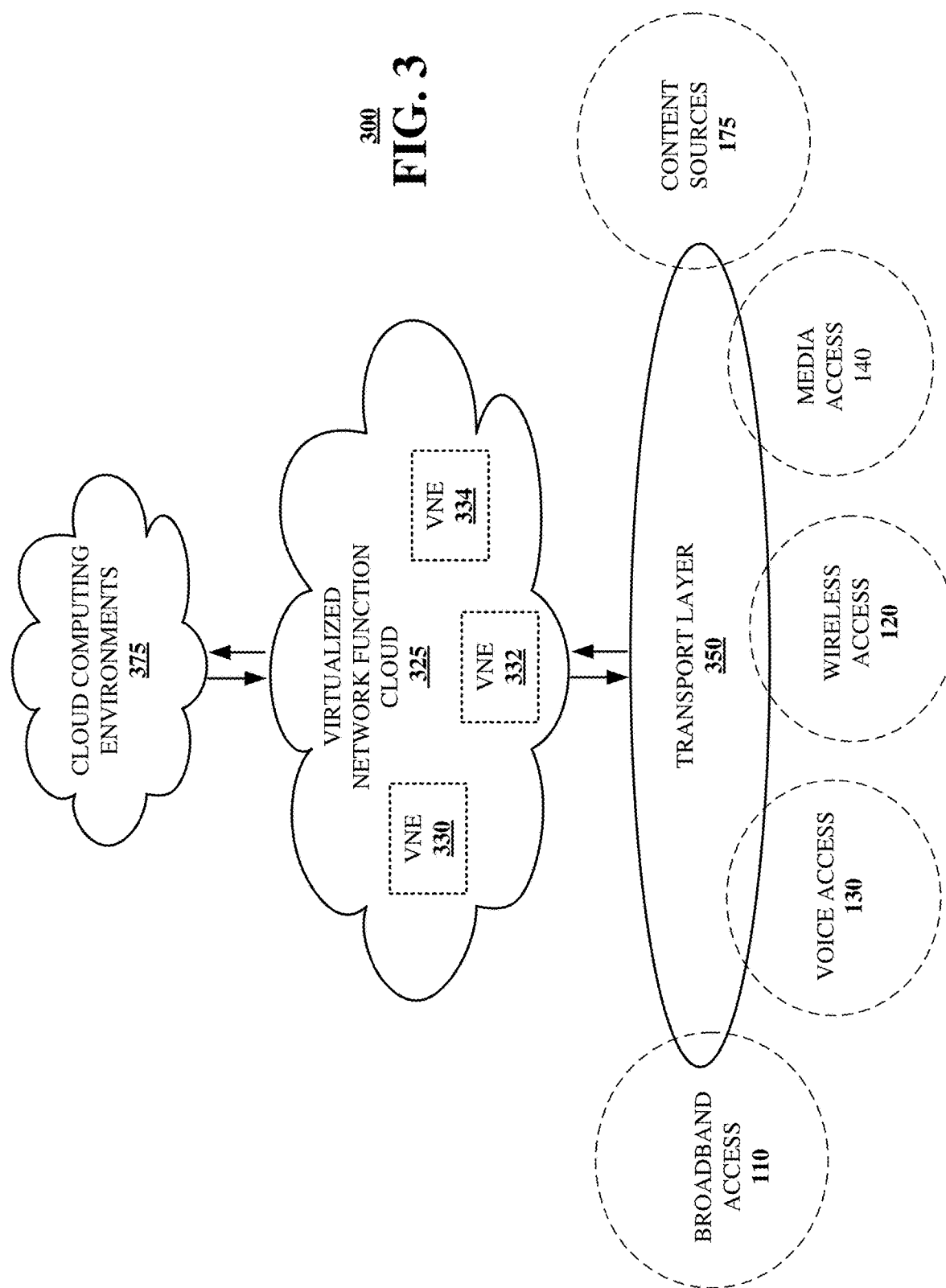
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200b presented in FIGS. 1, 2A, and 2B. For example, virtualized communication network 300 can facilitate in whole or in part establishing a first connection between a user equipment and a first cell of a communication network to provision a first portion of a communication service with respect to the user equipment, obtaining a first value for a first timing advance (TA) parameter associated with the first connection, providing, to the user equipment, a list of relations between the first cell and a plurality of other cells, obtaining, based on the providing of the list of relations, at least a second value for a second TA parameter associated with at least a second cell included in the plurality of other cells, obtaining a third value for a third TA parameter associated with a third cell, wherein the third cell is not included in the plurality of other cells, comparing the first value, the at least a second value, and the third value to one another, determining, based at least in part on the comparing, that a second portion of the communication service should be provided to the user equipment by the at least a second cell, the third cell, or a combination thereof, and providing, based on the determining, the second portion of the communication service to the user equipment via the at least a second cell, the third cell, or the combination thereof. Virtualized communication network 300 can facilitate in whole or in part obtaining a list of a plurality of cells, wherein the list relates each of the plurality of cells to a first cell that provides a first portion of a communication service to a processing system, detecting a signal from a second cell, wherein the second cell is not included in the list, based on the detecting, determining a first value for a first timing advance (TA) parameter of the second cell, and based at least in part on the determining, obtaining, by the processing system, a second portion of the communication service from the first cell, the second cell, a third cell, or any combination thereof, wherein the third cell is included in the list. Virtualized communication network 300 can facilitate in whole or in part obtaining, by a processing system including a processor, a first value for a first timing advance (TA) parameter associated with a first device, obtaining, by the processing system, a second value for a second TA parameter associated with a second device, wherein an identification of the second device is included in a list of equipment that is related to the first device, obtaining, by the processing system, a third value for a third TA parameter associated with a third device, wherein an identification of the third device is not included in the list, comparing, by the processing system, the first value, the second value, and the third value to one another to determine that the identification of the third device should be added to the list, and adding, by the processing system and based on the comparing, the identification of the third device to the list, resulting in a modified list.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
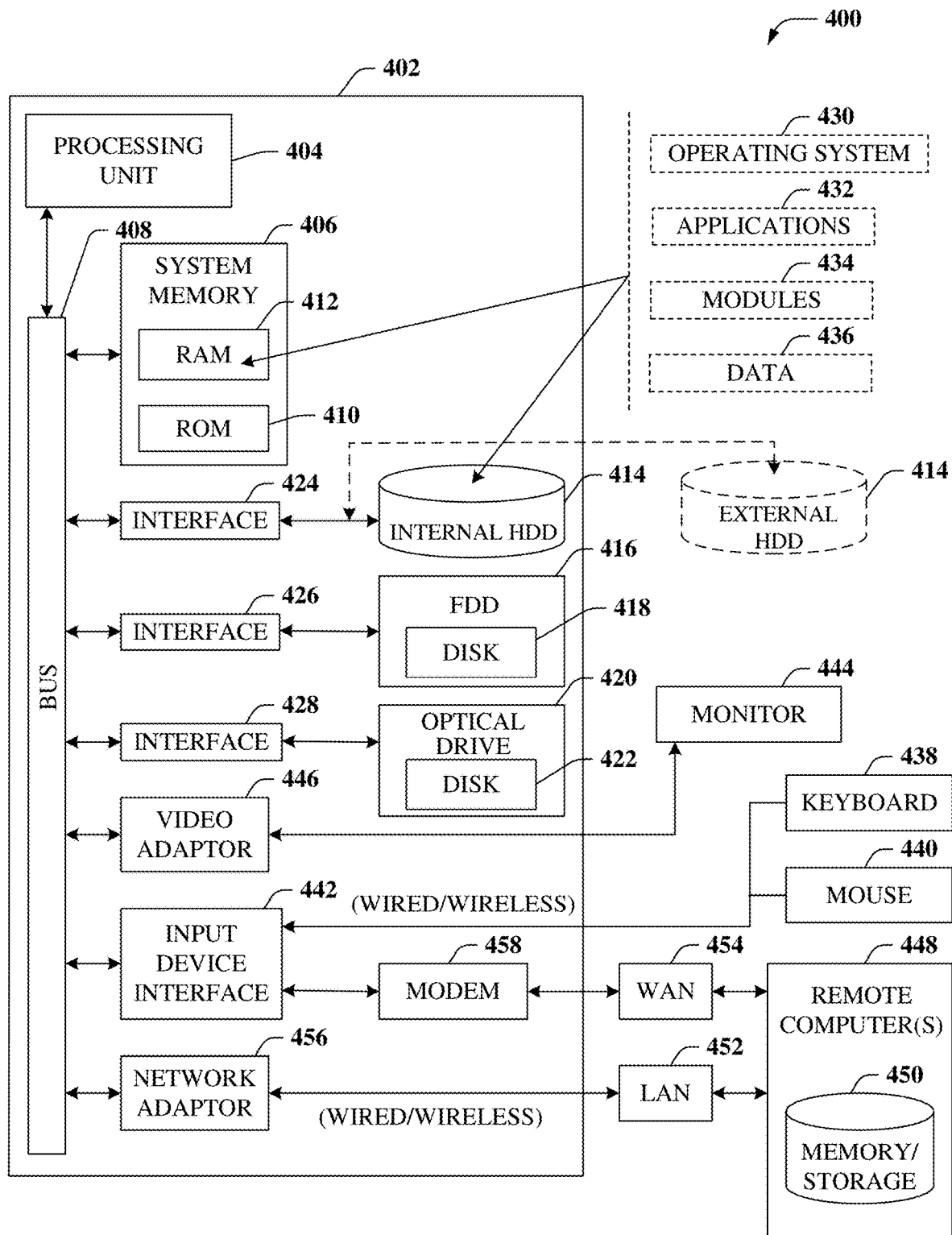
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part establishing a first connection between a user equipment and a first cell of a communication network to provision a first portion of a communication service with respect to the user equipment, obtaining a first value for a first timing advance (TA) parameter associated with the first connection, providing, to the user equipment, a list of relations between the first cell and a plurality of other cells, obtaining, based on the providing of the list of relations, at least a second value for a second TA parameter associated with at least a second cell included in the plurality of other cells, obtaining a third value for a third TA parameter associated with a third cell, wherein the third cell is not included in the plurality of other cells, comparing the first value, the at least a second value, and the third value to one another, determining, based at least in part on the comparing, that a second portion of the communication service should be provided to the user equipment by the at least a second cell, the third cell, or a combination thereof, and providing, based on the determining, the second portion of the communication service to the user equipment via the at least a second cell, the third cell, or the combination thereof. Computing environment 400 can facilitate in whole or in part obtaining a list of a plurality of cells, wherein the list relates each of the plurality of cells to a first cell that provides a first portion of a communication service to a processing system, detecting a signal from a second cell, wherein the second cell is not included in the list, based on the detecting, determining a first value for a first timing advance (TA) parameter of the second cell, and based at least in part on the determining, obtaining, by the processing system, a second portion of the communication service from the first cell, the second cell, a third cell, or any combination thereof, wherein the third cell is included in the list. Computing environment 400 can facilitate in whole or in part obtaining, by a processing system including a processor, a first value for a first timing advance (TA) parameter associated with a first device, obtaining, by the processing system, a second value for a second TA parameter associated with a second device, wherein an identification of the second device is included in a list of equipment that is related to the first device, obtaining, by the processing system, a third value for a third TA parameter associated with a third device, wherein an identification of the third device is not included in the list, comparing, by the processing system, the first value, the second value, and the third value to one another to determine that the identification of the third device should be added to the list, and adding, by the processing system and based on the comparing, the identification of the third device to the list, resulting in a modified list.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
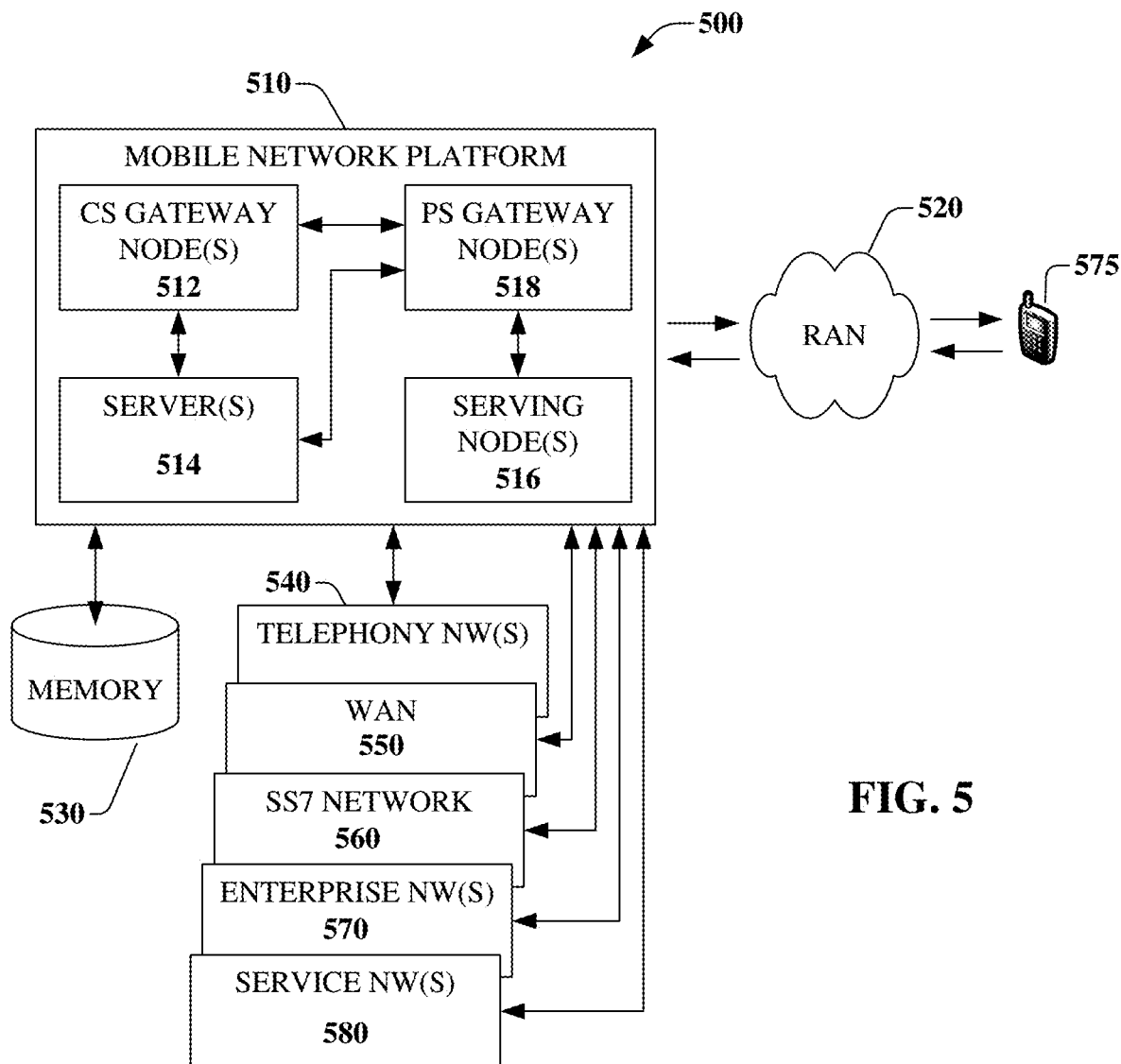
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part establishing a first connection between a user equipment and a first cell of a communication network to provision a first portion of a communication service with respect to the user equipment, obtaining a first value for a first timing advance (TA) parameter associated with the first connection, providing, to the user equipment, a list of relations between the first cell and a plurality of other cells, obtaining, based on the providing of the list of relations, at least a second value for a second TA parameter associated with at least a second cell included in the plurality of other cells, obtaining a third value for a third TA parameter associated with a third cell, wherein the third cell is not included in the plurality of other cells, comparing the first value, the at least a second value, and the third value to one another, determining, based at least in part on the comparing, that a second portion of the communication service should be provided to the user equipment by the at least a second cell, the third cell, or a combination thereof, and providing, based on the determining, the second portion of the communication service to the user equipment via the at least a second cell, the third cell, or the combination thereof. Platform 510 can facilitate in whole or in part obtaining a list of a plurality of cells, wherein the list relates each of the plurality of cells to a first cell that provides a first portion of a communication service to a processing system, detecting a signal from a second cell, wherein the second cell is not included in the list, based on the detecting, determining a first value for a first timing advance (TA) parameter of the second cell, and based at least in part on the determining, obtaining, by the processing system, a second portion of the communication service from the first cell, the second cell, a third cell, or any combination thereof, wherein the third cell is included in the list. Platform 510 can facilitate in whole or in part obtaining, by a processing system including a processor, a first value for a first timing advance (TA) parameter associated with a first device, obtaining, by the processing system, a second value for a second TA parameter associated with a second device, wherein an identification of the second device is included in a list of equipment that is related to the first device, obtaining, by the processing system, a third value for a third TA parameter associated with a third device, wherein an identification of the third device is not included in the list, comparing, by the processing system, the first value, the second value, and the third value to one another to determine that the identification of the third device should be added to the list, and adding, by the processing system and based on the comparing, the identification of the third device to the list, resulting in a modified list.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
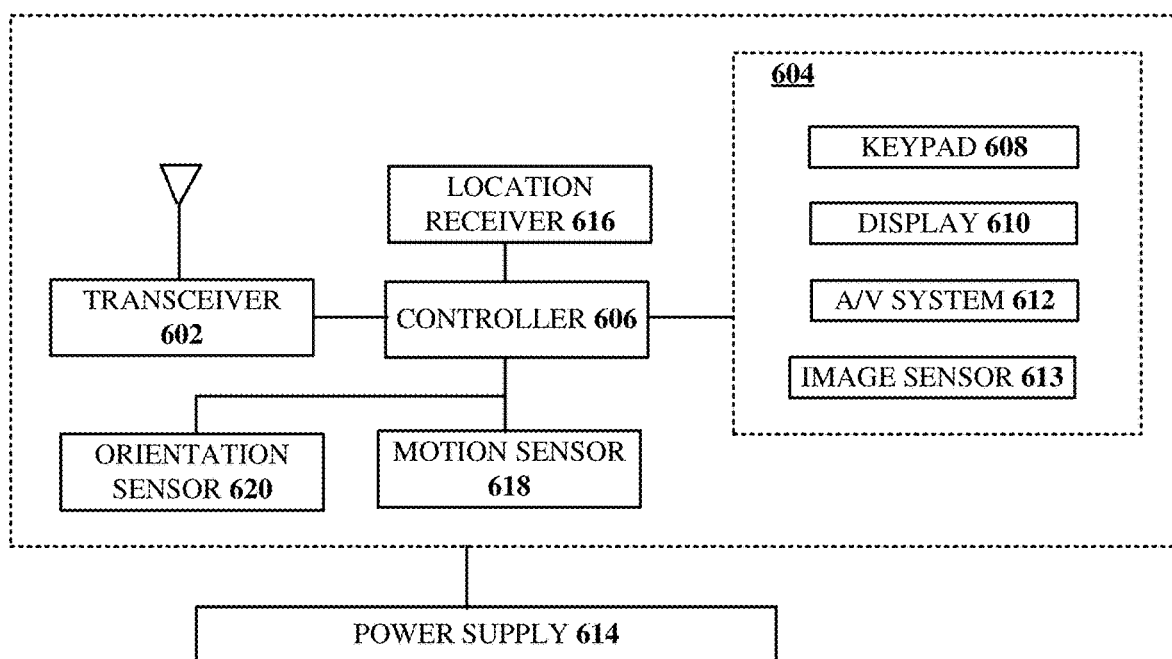
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part establishing a first connection between a user equipment and a first cell of a communication network to provision a first portion of a communication service with respect to the user equipment, obtaining a first value for a first timing advance (TA) parameter associated with the first connection, providing, to the user equipment, a list of relations between the first cell and a plurality of other cells, obtaining, based on the providing of the list of relations, at least a second value for a second TA parameter associated with at least a second cell included in the plurality of other cells, obtaining a third value for a third TA parameter associated with a third cell, wherein the third cell is not included in the plurality of other cells, comparing the first value, the at least a second value, and the third value to one another, determining, based at least in part on the comparing, that a second portion of the communication service should be provided to the user equipment by the at least a second cell, the third cell, or a combination thereof, and providing, based on the determining, the second portion of the communication service to the user equipment via the at least a second cell, the third cell, or the combination thereof. Computing device 600 can facilitate in whole or in part obtaining a list of a plurality of cells, wherein the list relates each of the plurality of cells to a first cell that provides a first portion of a communication service to a processing system, detecting a signal from a second cell, wherein the second cell is not included in the list, based on the detecting, determining a first value for a first timing advance (TA) parameter of the second cell, and based at least in part on the determining, obtaining, by the processing system, a second portion of the communication service from the first cell, the second cell, a third cell, or any combination thereof, wherein the third cell is included in the list. Computing device 600 can facilitate in whole or in part obtaining, by a processing system including a processor, a first value for a first timing advance (TA) parameter associated with a first device, obtaining, by the processing system, a second value for a second TA parameter associated with a second device, wherein an identification of the second device is included in a list of equipment that is related to the first device, obtaining, by the processing system, a third value for a third TA parameter associated with a third device, wherein an identification of the third device is not included in the list, comparing, by the processing system, the first value, the second value, and the third value to one another to determine that the identification of the third device should be added to the list, and adding, by the processing system and based on the comparing, the identification of the third device to the list, resulting in a modified list.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to pre-determined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
    obtaining a first value for a first timing advance (TA) parameter associated with a first connection, the first connection being between a user equipment and a first cell of a communication network, wherein the first connection is used to provision a first portion of a communication service with respect to the user equipment;
    providing, to the user equipment, a list of relations between the first cell and a plurality of other cells;
    obtaining, based on the providing of the list of relations, at least a second value for a second TA parameter associated with at least a second cell included in the plurality of other cells;
    obtaining a third value for a third TA parameter associated with a third cell, wherein the third cell is not included in the plurality of other cells;
    comparing the first value, the at least a second value, and the third value to one another;
    determining, based at least in part on the comparing, that a second portion of the communication service should be provided to the user equipment by the at least a second cell, the third cell, or a combination thereof; and
    providing, based on the determining, the second portion of the communication service to the user equipment via the at least a second cell, the third cell, or the combination thereof, wherein the third cell is blacklisted from or added to the list of relations depending on a number of candidate cells that are determined to be available to facilitate communication services for the user equipment, such that the third cell is blacklisted from the list of relations if the number of candidate cells is greater than a certain amount.

2. The device of claim 1, wherein the obtaining of the at least a second value for the second TA parameter comprises:
    obtaining at least one measurement from the user equipment, wherein the at least one measurement is associated with a signal transmitted by equipment of the at least a second cell; and
    based on the obtaining of the at least one measurement, analyzing the at least one measurement to generate the at least a second value.

3. The device of claim 1, wherein the obtaining of the at least a second value for the second TA parameter comprises:
    receiving the at least a second value from the user equipment.

4. The device of claim 1, wherein the providing of the second portion of the communication service to the user equipment via the at least a second cell, the third cell, or the combination thereof comprises handing over a communication session from the first cell to the at least a second cell, the third cell, or the combination thereof, and wherein the providing of the second portion of the communication service to the user equipment comprises the user equipment: establishing at least a second connection with the at least a second cell and establishing a third connection with the third cell.

5. The device of claim 1, wherein the third cell is added to the list of relations based on an adjustment of a comparison threshold that is triggered by the number of candidate cells being less than or equal to the certain amount, such that the third value for the third TA parameter is less than or equal to the comparison threshold, thereby indicating that the third cell is a suitable handover candidate for the user equipment, and wherein the third cell is blacklisted from the list of relations based on another adjustment of the comparison threshold that is triggered by the number of candidate cells being greater than the certain amount, such that the third value for the third TA parameter is greater than the comparison threshold, thereby indicating that the third cell is not a suitable handover candidate for the user equipment.

6. The device of claim 1, wherein the providing of the second portion of the communication service to the user equipment via the at least a second cell, the third cell, or the combination thereof comprises handing over a communication session from the first cell to the at least a second cell.

7. The device of claim 1, wherein the providing of the second portion of the communication service to the user equipment via the at least a second cell, the third cell, or the combination thereof comprises handing over a communication session from the first cell to the third cell.

8. The device of claim 1, wherein the at least a second cell includes the second cell and a fourth cell, and wherein the providing of the second portion of the communication service to the user equipment via the at least a second cell, the third cell, or the combination thereof comprises handing over a communication session from the first cell to the second cell, the fourth cell, or a combination thereof.

9. The device of claim 1, wherein the determining that the second portion of the communication service should be provided to the user equipment by the at least a second cell, the third cell, or the combination thereof, is further based on: a first load associated with the first cell, a second load associated with the at least a second cell, a third load associated with the third cell, or any combination thereof.

10. The device of claim 1, wherein the determining that the second portion of the communication service should be provided to the user equipment by the at least a second cell, the third cell, or the combination thereof, is further based on: a capability of the user equipment, an identification of an application executed by the user equipment, an identification of a communication session engaged in by the user equipment an identification of radio access technologies supported by the candidate cells, an identification of one or more security schemes supported by the candidate cells, or any combination thereof.

11. The device of claim 1, wherein the operations further comprise:
modifying, based on the comparing, the list of relations to generate a modified list of relations; and
providing, to the user equipment, the modified list of relations subsequent to the providing of the list of relations to the user equipment.

12. The device of claim 11, wherein the modifying the list of relations comprises adding the third cell to a white-list of the list of relations in generating the modified list of relations.

13. The device of claim 11, wherein the modifying the list of relations comprises adding the third cell to a black-list of the list of relations in generating the modified list of relations.

14. The device of claim 11, wherein the operations further comprise:
providing a third portion of the communication service to the user equipment in accordance with the modified list of relations,
wherein the providing of the third portion of the communication service occurs subsequent to the providing of the second portion of the communication service.

15. A non-transitory machine-readable medium, comprising executable instructions that, when executed by a processing system including a processor, facilitate performance of operations, the operations comprising:
obtaining a list of a plurality of cells, wherein the list relates each of the plurality of cells to a first cell that provides a first portion of a communication service to the processing system;
detecting a signal from a second cell, wherein the second cell is not included in the list;
based on the detecting, determining a first value for a first timing advance (TA) parameter of the second cell; and
based at least in part on the determining, obtaining, by the processing system, a second portion of the communication service from the first cell, the second cell, a third cell, or any combination thereof, wherein the third cell is included in the list, and wherein the second cell is blacklisted from or added to the list depending on a number of candidate cells that are determined to be available to facilitate communication services for the processing system, such that the second cell is blacklisted from the list if the number of candidate cells is greater than a certain amount.

16. The non-transitory machine-readable medium of claim 15, wherein the operations further comprise:
determining a second value for a second TA parameter of the first cell;
determining a third value for a third TA parameter of the third cell; and
comparing the first value, the second value, and the third value,
wherein the obtaining of the second portion of the communication service is further based on the comparing.

17. The non-transitory machine-readable medium of claim 16, wherein the operations further comprise:
selecting, based on the comparing, one of the first cell, the second cell, and the third cell to provide the second portion of the communication service, resulting in a selected cell, such that the selected cell has a lowest TA value as between the first cell, the second cell, and the third cell.

18. The non-transitory machine-readable medium of claim 15, wherein the obtaining of the second portion of the communication service comprises establishing a connection between the processing system and the second cell, the third cell, or a combination thereof.

19. A method, comprising:
obtaining, by a processing system including a processor, a first value for a first timing advance (TA) parameter associated with a first device;
obtaining, by the processing system, a second value for a second TA parameter associated with a second device, wherein an identification of the second device is included in a list of equipment that is related to the first device;
obtaining, by the processing system, a third value for a third TA parameter associated with a third device, wherein an identification of the third device is not included in the list;
comparing, by the processing system, the first value, the second value, and the third value to one another to determine that the identification of the third device should be added to the list; and adding, by the processing system and based on the comparing, the identification of the third device to the list, resulting in a modified list, wherein the third device is blacklisted depending on a number of candidate devices that are determined to be available to facilitate communication services for a user equipment, such that the identification of the third device is removed from the modified list if the number of candidate devices is greater than or equal to a certain amount.

20. The method of claim 19, further comprising:

providing, by the processing system, at least a portion of a communication service to the user equipment in accordance with the modified list.

\* \* \* \* \*